United States Patent
Erixon et al.

(10) Patent No.: US 7,233,678 B2
(45) Date of Patent: Jun. 19, 2007

(54) SPEAKER ARRANGEMENT FOR COMMUNICATION TERMINAL

(75) Inventors: Mats Erixon, Bjärred (SE); Göran Schack, Yngsjö (SE); Stig Frohlund, Hässleholm (SE); Olof Simonsson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 198 days.

(21) Appl. No.: 10/519,822

(22) PCT Filed: Jun. 26, 2003

(86) PCT No.: PCT/EP03/06724

§ 371 (c)(1),
(2), (4) Date: Dec. 30, 2004

(87) PCT Pub. No.: WO2004/004408

PCT Pub. Date: Jan. 8, 2004

(65) Prior Publication Data
US 2005/0233781 A1    Oct. 20, 2005

Related U.S. Application Data

(60) Provisional application No. 60/394,404, filed on Jul. 8, 2002.

(30) Foreign Application Priority Data
Jul. 1, 2002    (EP) .................................. 02077565

(51) Int. Cl.
*H04R 1/02* (2006.01)

(52) U.S. Cl. ........................................ 381/345; 455/350
(58) Field of Classification Search ................ 381/345, 381/394, 162, 351, 353, 354, 386; 455/90.3, 455/347, 350, 351; 379/428.02, 429, 433.02
See application file for complete search history.

(56) References Cited

U.S. PATENT DOCUMENTS

| | | | | |
|---|---|---|---|---|
| 5,721,787 A | * | 2/1998 | Neibaur et al. | 381/386 |
| 5,790,679 A | * | 8/1998 | Hawker et al. | 381/163 |
| 5,963,640 A | * | 10/1999 | Rabe | 379/433.02 |
| 6,411,719 B1 | | 6/2002 | Möster et al. | 381/345 |
| 6,628,798 B2 | * | 9/2003 | Teshima et al. | 381/396 |
| 6,728,386 B1 | * | 4/2004 | Andersen | 381/345 |

(Continued)

FOREIGN PATENT DOCUMENTS

EP    1107542 A1 *    6/2001

(Continued)

*Primary Examiner*—Sinh Tran
*Assistant Examiner*—Joseph Saunders, Jr.
(74) *Attorney, Agent, or Firm*—Myers Bigel Sibley & Sajovec, PA

(57) ABSTRACT

A communication terminal includes a housing carrying therein a radio antenna element, a speaker, and a chamber that acts as an electromagnetic resonance cavity for the antenna and as an acoustic resonance cavity for the speaker. The speaker is mounted inside the chamber and is coupled to the outside of the housing through a sound channel. The terminal includes a user interface on a front side of the housing and the speaker is placed behind the user interface as viewed from the front side, with the sound channel extending from a channel inlet at the speaker to a channel front outlet at the front side.

12 Claims, 4 Drawing Sheets

U.S. PATENT DOCUMENTS

| | | | |
|---|---|---|---|
| 6,922,471 B1* | 7/2005 | Marqvardsen et al. | 379/433.02 |
| 7,092,745 B1* | 8/2006 | D'Souza | 455/575.1 |
| 2002/0052216 A1* | 5/2002 | Song | 455/550 |
| 2003/0032443 A1* | 2/2003 | Johnson et al. | 455/550 |
| 2004/0203997 A1* | 10/2004 | Kaikuranta et al. | 455/550.1 |

FOREIGN PATENT DOCUMENTS

| | | |
|---|---|---|
| EP | 1184936 A1 | 3/2002 |
| GB | 2310559 A | 8/1997 |
| WO | WO 01/01591 A1 | 1/2001 |

* cited by examiner

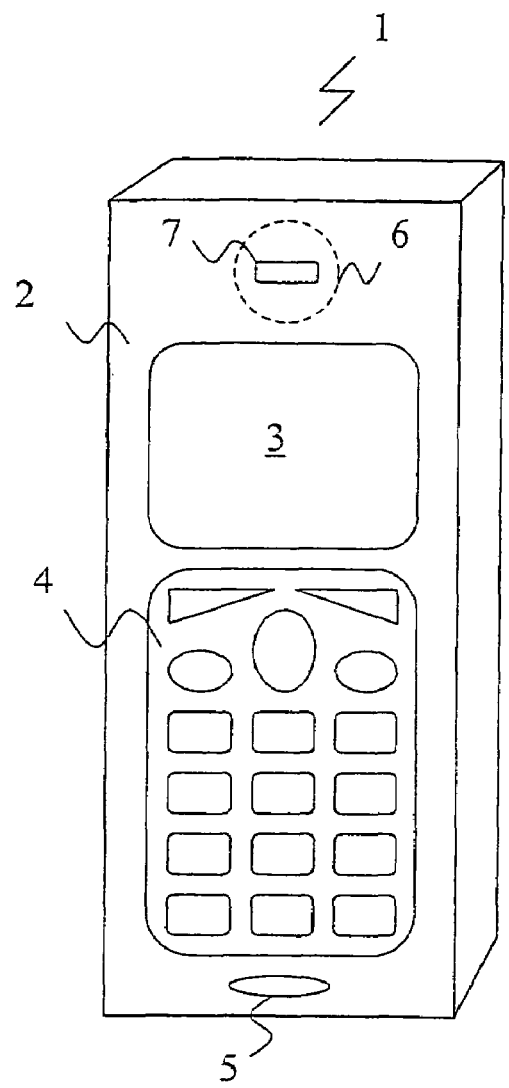
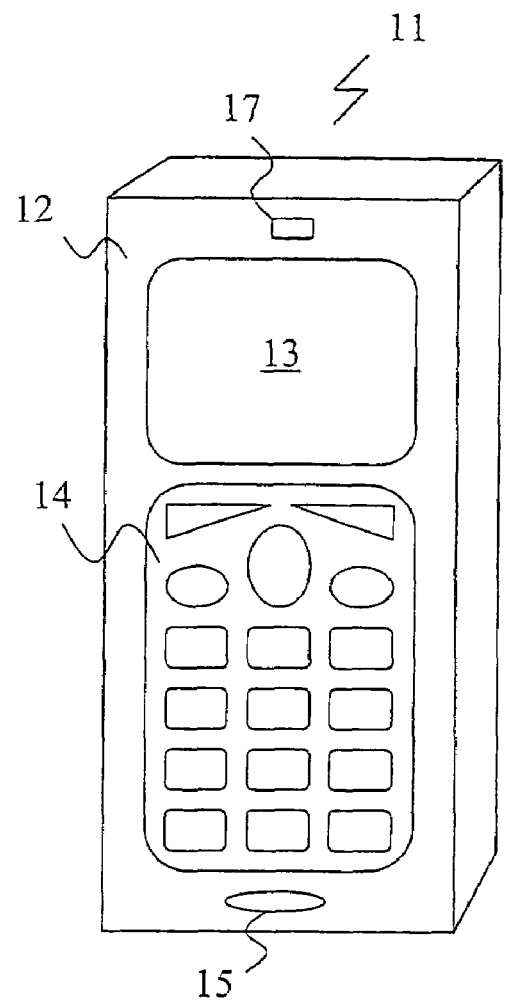
PRIOR ART
Fig. 1
Fig. 2

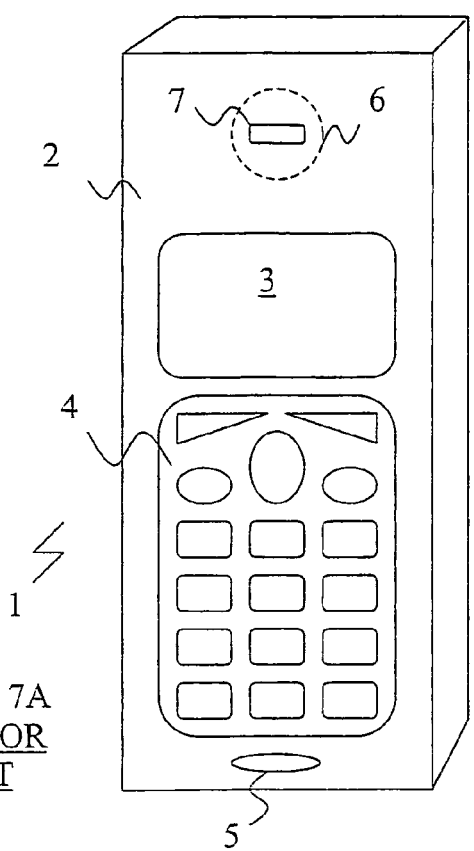
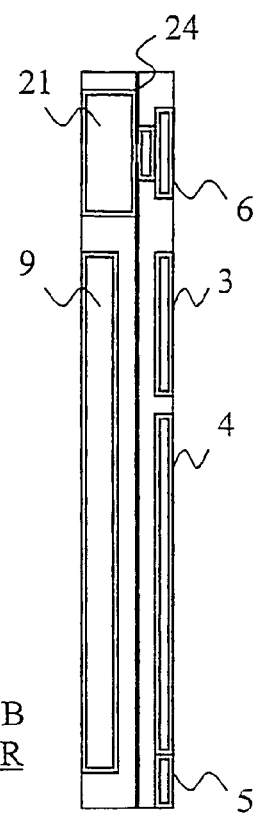
Fig. 7A PRIOR ART  Fig. 7B PRIOR ART
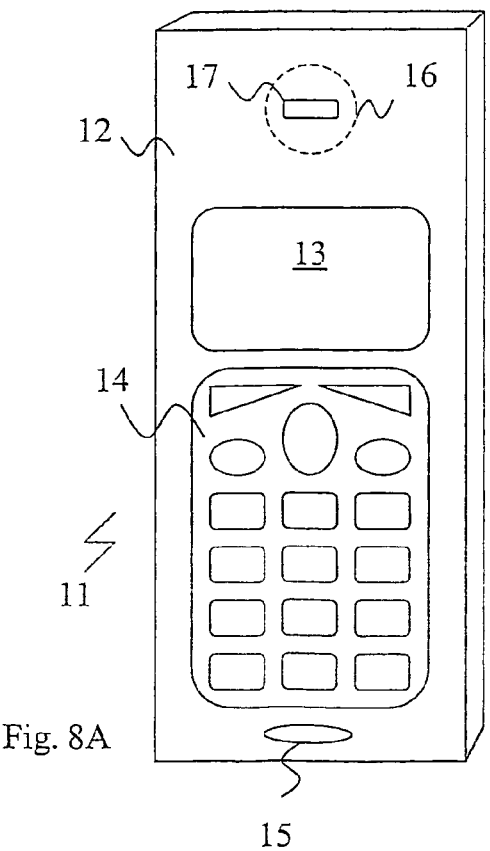
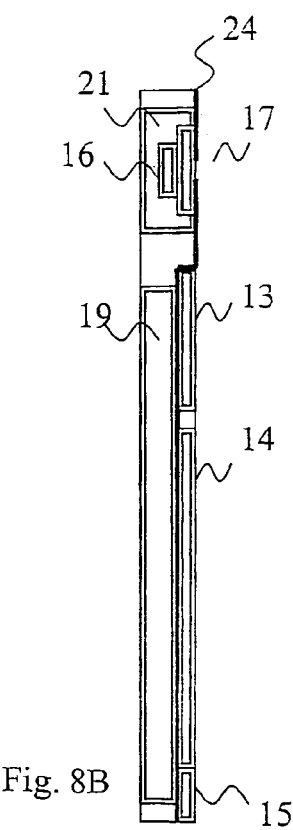
Fig. 8A  Fig. 8B

SPEAKER ARRANGEMENT FOR COMMUNICATION TERMINAL

RELATED APPLICATIONS

The present application is a 35 U.S.C. §371 national phase application of PCT International Application No. PCT/EP2003/006724, having an international filing date of Jun. 26, 2003, and claiming priority to European Patent Application No. 02077565.6, filed Jul. 1, 2002, and U.S. Provisional Application No. 60/394,404, filed Jul. 8, 2000 the disclosures of which are incorporated herein by reference in their entireties. The above PCT International Application was published in the English language and has International Publication No. WO 2004/004408 A1.

FIELD OF THE INVENTION

The present invention relates generally to a communication terminal comprising an antenna for wireless communication purposes, and a speaker for conveying audio information to a user of the communication terminal. More specifically the invention relates to a communication terminal wherein such a speaker is arranged inside the resonance chamber of said antenna.

BACKGROUND

The mobile phone industry has had an enormous development both regarding quality of service and transmission capabilities, as well as the technology for producing advanced communications terminals. In only a couple of decades the communication systems have gone from analogue to digital, and at the same time the dimensions of the communication terminals have gone from briefcase size to the pocket size phones of today. Still today, mobile phones are getting smaller and smaller and the size is generally considered to be an important factor for the end customer: The development in electronics has made it possible to miniaturize the components of the terminals, at the same time making the terminals capable of performing more advanced functions and services. The development of new transmission schemes, the so-called $3^{rd}$ generation mobile system standing at the door and the $4^{th}$ generation to be expected maybe ten years later, also provides the possibility to convey more advanced data to the wireless communication terminals, such as real time video.

In order to benefit from the capabilities of the transmission system, the future generation of phones will have a large display in order to perform multimedia input and output, and the picture quality will be of high importance. Still, the keypad or keyboard must be large enough to allow people to press one key at a time.

FIG. 1 discloses a typical example of a state of the art mobile phone or communication terminal 1, carried by a housing or chassis 2. The size of a keypad 4 and a display 3 basically sets the limit of how small the terminal 1 can be. However, to be able to work as a standard phone for voice interaction, the terminal 1 also includes a microphone 5 and a speaker 6, preferably arranged at opposite ends of the terminal 1. FIG. 3 discloses a different embodiment of a state of the art communication terminal 1, wherein the display 3 occupies a larger portion of the front side of the terminal. Several of the functions of the keypad 4 have been included in a graphical user interface applicable to the display 3, rendering a data input interface having less keys. Those keys 4 may also be moved to the side of the communication terminal in order to allow for the display 3 to occupy a larger portion of the front side of terminal 1. A specific tool 8 may be provided for inputting data on a touch-sensitive screen of the display 3. FIGS. 1 and 3 show two typical examples of state of the art communication terminals 1, whereas the skilled persons will realize that combinations of the two are also well known as well as other designs.

With the development of the communication systems and the capabilities of multimedia functions, the demands on the sound quality from the terminals will also increase. In the next generation of terminals using Wideband Code Division Multiple Access (W-CDMA) technique, it will be possible to user a wider audio frequency band. The speaker of the terminal may also be used as a ringer instead of a traditional buzzer, for a single tone or polyphonic ring signals, and as a hand free speaker built into the phone. Normally, these functions are performed by a second speaker mounted in the back of the phone, but combined speakers for two or all three of these functions exist.

In the state of the art communication terminal a terminal output 7 is mounted on the front of the terminal above the display with the speaker 6 immediately behind the output 7, as shown in FIGS. 1 and 3. This means that even with a smallest available speaker used today, with a diameter of about 13 mm, the terminal would be approximately this much longer in its longitudinal extension than what would have been the case if only the display 3 and/or keypad 4 had defined the length of the terminal 1. The antenna of the terminal is generally located at the upper portion of the backside of the terminal, the lower backside being occupied by a battery. Placing the speaker 6 behind the display 3 would therefore increase the thickness of the terminal 1 since it would have to compete with the antenna for the relevant space.

The performance of the speaker is to a high extent dependent on the back volume, i.e., the acoustic resonance cavity behind the speaker. For best performance, the back volume should be sealed. In a normal case the whole phone is used as a back volume, but it is almost impossible to seal a phone. As mentioned above, almost every phone today has the speaker position in the upper parts of the front of the terminal above the display and keyboard. This means that the height of the speaker, display and the keyboard determines the length of the phone. Since the speaker performances is highly dependent on the dimension, reduction of the speaker size results in less good acoustics. There is also a general desire to have larger displays in the communication terminal, not just wider by also longer, and with the common layout of the keyboard such as disclosed in FIG. 1 and which people are used to, the height of the terminal can basically not be reduced more than today without resulting drawbacks to the display 3 or keypad 4.

A solution to this problem of miniaturization of communication terminals is proposed in WO 00/38475, in which the acoustic resonance chamber of the speaker is completely or partly located in the electromagnetic resonance chamber of the antenna. The use of a single resonance chamber instead of two separate ones makes it possible to manufacture smaller communication devices. According to the proposed solutions the speaker is placed outside the resonance chamber, the backside of the speaker being connected to the resonance chamber by at least one acoustic channel. However, the arrangement of the speaker beside the resonance chamber has some drawbacks. First of all the acoustic channel has to be properly sealed. Furthermore, the speaker and chamber will both add to the thickness of the terminal, and at the same time the height of the speaker will contribute to the length of the terminal.

SUMMARY OF THE INVENTION

It is consequently an object of the present invention to overcome the deficiencies related to the state of the art communication terminal as recited above. More specifically, it is an object to provide a speaker arrangement for a communication terminal making it possible to decrease the outer terminal dimensions. According to the present invention, this object is fulfilled by communication terminal comprising a housing carrying therein a radio antenna element, a speaker, and a chamber acting as an electromagnetic resonance cavity for the antenna as well as an acoustic resonance cavity for the speaker. According to the invention, the speaker is mounted inside said chamber and is coupled to the outside of the housing through a sound outlet. By using the antenna cavity a good resonance chamber is provided for the speaker. Furthermore, by placing the speaker inside the cavity, the thickness contribution of the speaker is eliminated. Tests performed on a prototype apparatus have shown the surprising result that the speaker will not, or to a very little extent, affect the performance of the antenna.

In one embodiment, the communication terminal comprises a user interface on a front side of the housing, wherein said speaker is placed behind said user interface as seen from said front side. The user interface may be a display or a key pad. In such an embodiment, said sound outlet is preferably coupled to said speaker by a sound channel which extends from a channel inlet at the speaker. Furthermore, said sound channel preferably comprises at least one bent portion, such that the sound channel bends around said user interface and extends at said channel front outlet substantially perpendicular to said front side. Said sound channel may further be devised with a channel top outlet extending in a substantially longitudinal direction of the terminal at a top side of said housing.

In one embodiment, a ground plane defines a wall part of the chamber, through which wall part said sound channel outlet extends. The speaker is preferably mounted under said ground plane, as seen from said front side. The chamber may further be sealed, and have a substantially rectangular box shape.

In one embodiment, the speaker and the user interface are placed next to each other. However, a first part of the ground plane is located adjacent to the front part of the housing over the speaker antenna, and a second part of the ground plane is located under the user interface, wherein said first and second parts are connected by a bent portion of the ground plane. This way the top portion of the terminal, comprising the antenna and the speaker, will basically be confined between the ground plane, i.e. the first part thereof, and the antenna element, rendering a very slim profile. The bent portion allows for the two parts of the ground plane to be arranged at different levels, though potentially parallel to each other. This way the user interface, which has a certain thickness, can be positioned with its front face basically in the same plane as the front side of the top portion.

Preferably said antenna element comprises a substantially flat pattern of conductive material on an inner wall of said chamber.

The speaker may be devised to convey audio information such as speech to a terminal user. Furthermore, the speaker may comprise a buzzer devised to act as a ringer by transmitting a predetermined sound signal to bring a user's attention to the terminal. Alternatively, said speaker may be a multi mode actuator devised to act as a ringer and a vibrator by transmitting predetermined sound signals or vibrations to bring a user's attention to the terminal.

BRIEF DESCRIPTION OF THE DRAWINGS

Further features and advantages of the present invention will become more apparent from the following description of preferred embodiments, with reference to the accompanying drawings, on which FIG. 1 schematically shows a state of the art communication terminal of a first type;

FIG. 2 schematically illustrates an embodiment of a communication terminal according to the present invention, otherwise designed according to the terminal type of FIG. 1;

FIGS. 7A and 7B illustrate a state of the art communication terminal in a front view and a sectional side view; and FIGS. 8A and 8B illustrate a terminal according to an embodiment of the invention in a front view and a sectional side view.

DETAILED DESCRIPTION OF PREFERRED EMBODIMENTS

The present description refers to communication terminals as a device in which to implement the speaker configuration according to the present invention. The communication terminal includes all mobile equipment devised for radio communication with a radio station, which radio station may also be a mobile terminal or e.g. a stationary base station. Consequently, the term "communication terminal" includes mobile phones, pagers, communicators, electronic organizers, smart phones, PDA:s (Personal Digital Assistants), vehicle-mounted radio communication devices or the like, as well as portable laptop computers devised for wireless communication in for instance WLAN (Wireless Local Area Network). Furthermore, since the design and present invention is suitable for but not restricted to mobile use, the term "communication terminal" should also be understood as to include any stationary device arranged for radio communication, such as for instance desk top computers, printers, fax machines and so on, devised to operate with radio communication with each other or some other radio station. Hence, although the structure and characteristics of the antenna design according to the invention is mainly described herein, by way of example, in the implementation in a mobile phone, this is not to be interpreted as excluding the implementation of the inventive design in other types of radio terminals, such as those listed above. Furthermore, it should be emphasised that the term "comprising" or "comprises" when used in this description and in the appended claims to indicate included features, elements or steps, is in no way to be interpreted as excluding the presence of other features, elements or steps than those expressed or stated.

Figure 4:
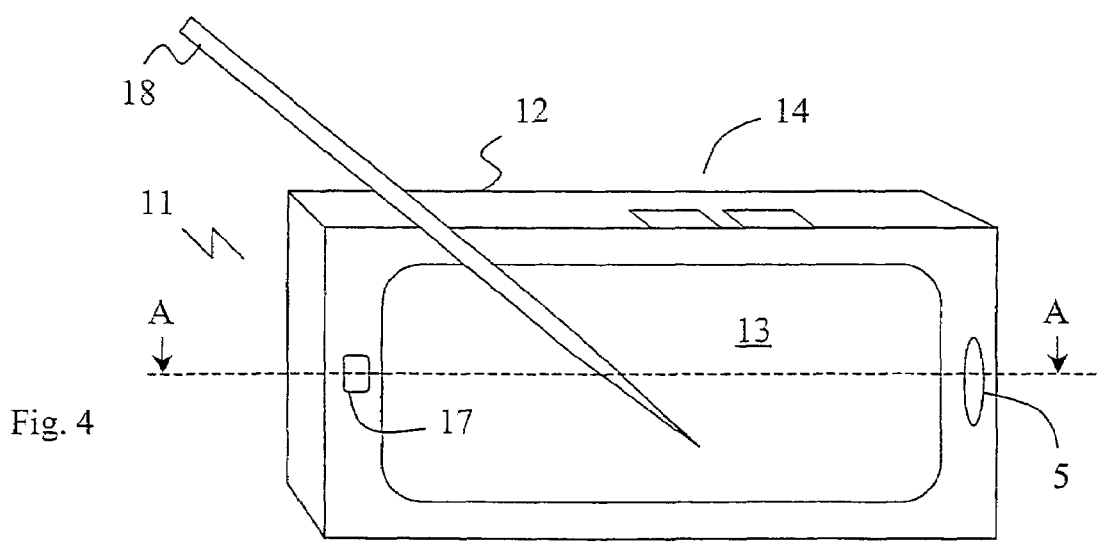
FIGS. 4 and 5 illustrate embodiments of communication terminals according to the present invention otherwise designed according to the terminal type of FIG. 3.
Figure 6:
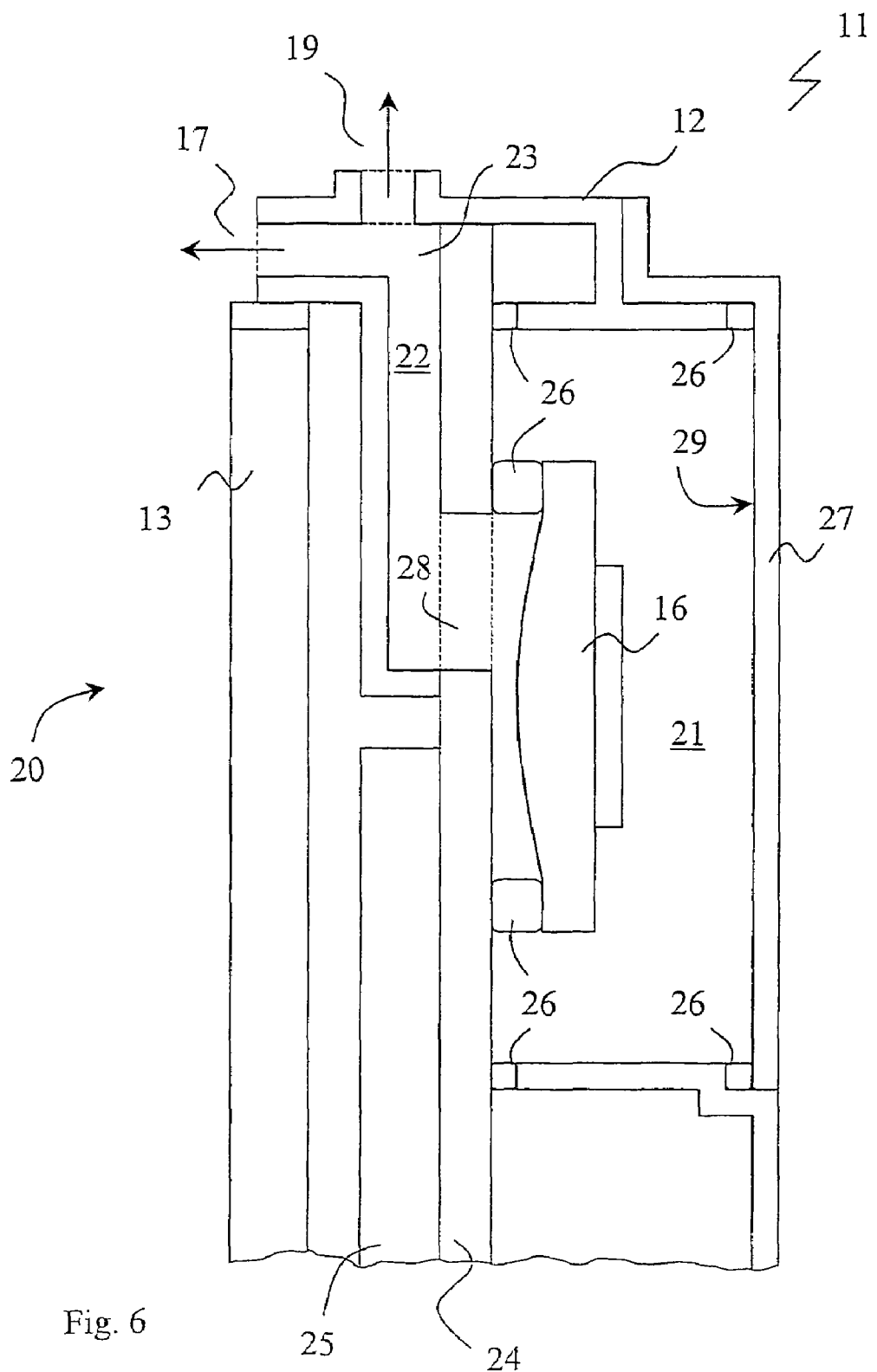
FIG. 6 schematically illustrates a sectional side view of a portion of a communication terminal according to an embodiment of the present invention.

FIG. 4 illustrates one embodiment of the present invention as seen from the front side. FIG. 6 illustrates a portion of FIG. 4 as seen from section A—A indicated in FIG. 4. It should be noted, though, that the drawing in FIG. 6 is equally applicable to an embodiment of the present invention as shown in for example FIG. 2.

Figure 5:
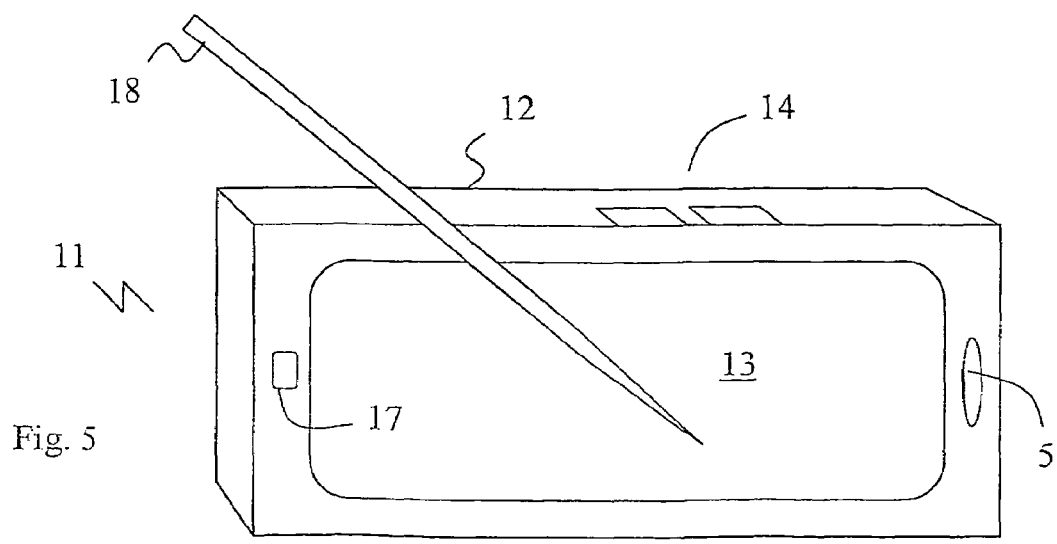

Consequently, FIG. 6 illustrates a portion of a communication terminal 11 as seen from the side, with the front side 20 facing left in the drawing. It should be noted that FIG. 6 is highly schematic, intended to show the principal of an embodiment of the present invention and not necessarily a functioning design. Terminal 11 comprises a Printed Circuit Board (PCB) 24 carried in a chassis or housing 12. The PCB 24 supports the electronics 25 of terminal 11. At the front side 20 a display 13 is located, preferably devised as a LCD module (Liquid Crystal Display). As shown in the example of FIGS. 4 and 5 the display 13 may occupy a major portion of the front side 20, whereas in a more traditional design according to FIG. 2, the display is mainly located at upper parts of the terminal. Behind the display 13 and PCB 24, a radio antenna 29 of terminal 11 is arranged. PCB 24 includes a ground plane towards the antenna 29, which antenna is devised for reception and transmission of radio signals according to the established art. The specific design of the radio antenna 29, which may e.g. be a micro strip antenna or a PIFA antenna (Planar Inverted-F Antenna), is not of importance for the present invention, although the invention relates to antennas which demand a cavity or distance between the antenna element and the ground plane. In the illustrated embodiment of FIG. 6, however, the antenna 29 is some form of low profile flat antenna formed or placed on the inside of an antenna lid 27. The feeding connection of antenna 29 to the PCB is not shown, neither is a connection to the ground plane which may be included dependent on the antenna type. The antenna 29 is situated at a certain distance from the PCB 24, such that an electromagnetic resonance cavity 21 is located there between, in a manner well known in the art. A chamber 21 acting as the electromagnetic resonance cavity is preferably a sealed box defined between the antenna lid 27, the PCB 24, and side walls, and the chamber 21 is sealed by gaskets 26.

A speaker 16 is located inside chamber 21 and mounted adjacent PCB 24 with gaskets 26, such that the front side of speaker 16, illustrated in the drawing by the curved portion, is sealed from the cavity of chamber 21. This way, chamber 21 will also act as an acoustic resonance cavity for speaker 16. The front side of speaker 16 is coupled to the outside of the housing 12 through a sound channel 22 to an output opening 17 in housing 12. Sound channel 22 includes a channel inlet 28 forming an opening in the PCB 24 to the front side of speaker 16.

Consequently, speaker 16 is located behind the display 13, and the length or height of speaker 16 is not added to the total length of terminal 11. It should be noted though, that in an alternative design of communication terminal 11 (not shown) in which the display is arranged at the bottom of the phone near a microphone 15, and a key pad 14 is arranged at the top of the phone, speaker 16 would be located behind key pad 14 rather than display 13. By placing speaker 16 inside chamber 21, the thickness of 16 does not add to the total thickness of terminal 11, thereby rendering a smaller terminal.

Figure 3:
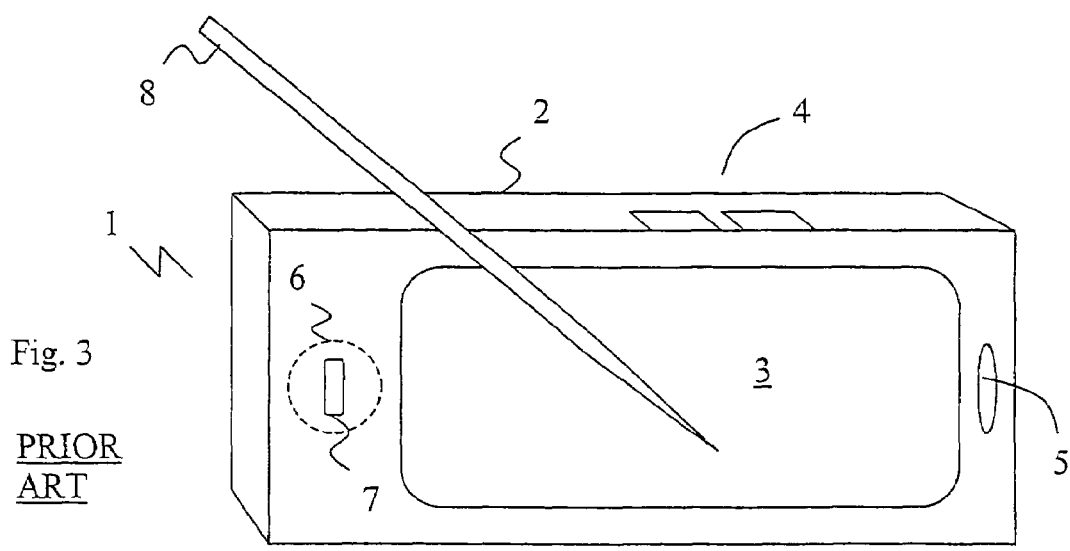
FIG. 3 schematically illustrates a second type of terminal according to the state of the art.

By placing speaker 16, and cavity 21, behind the user interface, i.e. the display 13 or keypad 14, the height of speaker 16 does not add to the length of terminal 11. Instead, only the height of the outlet 17 of sound channel 22 will add to the length of the phone. This is shown for the first type of communication terminal 11 of FIG. 2, which should be compared to the state of the art terminal of FIG. 1. The terminal 11 of FIG. 2 is obviously shorter in the longitudinal direction than terminal 1 of FIG 1. For the second type of terminal the inventive design is disclosed in FIGS. 4 and 5. Comparing the embodiment of terminal 11 in FIG. 4 with the state of the art terminal 1 of FIG. 3, terminal 11 is clearly smaller. However, instead of making the entire terminal smaller, it is of course possible to use the space otherwise occupied by a speaker to increase the user interface, in the example of FIG. 5 by including a larger display 13. In the embodiments of FIGS. 4 and 5 as well as the state of the art terminals of FIG. 3 an auxiliary tool 18 may be used to interact with the phone by pressing touch sensitive areas of display 3, 13 in a manner well known in the art.

In order to port the audio signals from speaker 16 into the front side 20 of terminal 11, sound channel 22 comprises at least one bent portion 23, such that the sound channel bends round the user interface 13, 14 in front of speaker 16. Preferably sound channel 22 exits at the front side 20 of terminal 11 substantially perpendicular thereto, as illustrated by the arrow at outlet 17. In one embodiment the sound channel 22 further has a sound channel top outlet 19, exiting in a substantially longitudinal direction of terminal 11 at a top side of housing 12, as illustrated by the arrow at outlet 19. This outlet 19 may be used as a hands-free speaker outlet.

In FIG. 7A a state of the art terminal much like the one in FIG. 1 is shown from the front side. in FIG. 7B the same terminal is schematically illustrated from the side in a sectional view with the front side facing left. In this drawing a number of elements normally include in a radio communication terminal or disclosed. It should be emphasized, though, that the dimensions are merely exemplary to illustrate the contribution and advantage of certain features of this embodiment of the invention. Furthermore, connections between the different elements of the terminal are not shown. A ground plane 24 is arranged in the terminal extending longitudinally through a part, or substantially the entire body, of the terminal. Normally, this ground plane is a layer of a printed circuit board carrying the electronics of the terminal. A speaker 6 is placed at the front side of the terminal over the ground plane as seen from the front side. The back of the speaker is coupled to the cavity 21, placed behind the ground plane, through an opening in the ground plane as illustrated in the drawing. The back wall of cavity 21, i.e. the wall opposite to the ground plane, carries an antenna element, e.g. in the shape of a PIFA. A user interface comprises a display 3 and a key pad 4, and a microphone 5 is placed at the bottom of the terminal. A battery 9 is further included to supply the terminal electronics with electrical power.

In FIGS. 8A and 8B an embodiment of the present invention is disclosed, in which the speaker 16 is placed beside the user interface 13, rather than under as in the embodiments of FIGS. 2, 4, 5 and 6. In this embodiment there is no real sound channel, rather only an opening or outlet 17. The speaker 16 is placed inside the antenna cavity 21, in order to benefit from the same space for acoustic purposes, as previously described. At the top portion of the terminal, i.e. the portion comprising the speaker and the antenna, the thickness of the terminal is in this embodiment basically defined by the distance between the antenna and the ground plane, since the thickness contribution from the speaker has been eliminated. Furthermore, even though the antenna cavity 21 has been partly occupied by the speaker, experimental laboratory tests on this design have surprisingly shown that the presence of the speaker will not result in reduced antenna performance if tuned properly.

The drawings of FIGS. 7B and 8B indicate that the entire terminal can be made thinner by implementation of this embodiment. Naturally, this is dependent on the dimensions of the user interface, the battery, other electronics, and so on, and the arrangement of these elements. However, FIG. 8B further shows a feature relating to the ground plane. A first, upper, part of the ground plane defines the front face of the terminal, although it is preferably covered by a housing directly adjacent to the ground plane 24. Since the user interface, e.g. the display 13, has a certain thickness, the ground plane has a bent portion between the speaker and the user interface, wherein the ground plane first bends downwards towards the back side of the terminal, and then bends back towards the lower end carrying the microphone 15. This way a second, lower, part of the ground plane is formed which extends in a plane closer to the back of the terminal than the first part. This makes room for the display 13 and the key pad 14 to be arranged over the ground plane, with their front sides substantially in the same plane as the top portion of the terminal, with the sound outlet 17 from the speaker. As is well known to the skilled person, the purpose of the antenna cavity is to place the antenna at a certain distance from the ground plane. For this reason it is likewise important in the present embodiment that the bent portion is not to close to the antenna, such that the uppermost edge of the lower part of the ground plane is located too close to the antenna. In other words, a certain minimum distance between the antenna and ground can be defined, and no part of the ground plane may be placed closer to the antenna than that.

Chamber 21 acting as a cavity for both acoustic resonance and electromagnetic resonance may be a rectangular box, which makes it easy to seal by means of gaskets 26. As mentioned before, antenna 29 may be a separate conductive element placed on the inside of the antenna lid 27 but may also be a conductive pattern coated on the inside of lid 27.

The present invention brings about several advantages, thanks to the inventive idea to mount the speaker inside the antenna cavity, where the antenna cavity is a sealed box. The front side of speaker 16 is ported to the terminal front 20 by a thin channel 22. By mounting the speaker 16 in a sealed box 21 it is possible to use a smaller speaker 16 than normal. This solution can also be used when the speaker 16 performs in more than one mode. Consequently, speaker 16 can be used as a ringer in ringer mode, and also as a hands-free speaker in speakerphone mode. Porting the speaker to the front of the terminal by use of a sound channel 22 makes it possible to reduce the length of terminal 11 by five to ten millimeters and still keep the thickness at a minimum. Also the weight of the terminal 11 may be reduced due to the smaller terminal dimension. The antenna cavity of chamber 21 is used to create a distance between antenna 29 and the ground plane of PCB 24 in order to improve the bandwidth of the antenna, as is well known in the prior arts. Otherwise this cavity is normally not used for anything else. Furthermore, by placing speaker 16 inside cavity 21, the function of chamber 21 as an electromagnetic cavity will not be effected in any negative way, and will therefore not disturb the performance of terminal 11.

The foregoing has described the principals, preferred embodiments and modes of operation of the present invention. However, the invention should not be construed as being limited to the particular embodiments discussed above. For example, it is well known in the state of the art to design mobile or cellular phones in a foldable housing 12. Still, the desire to have small terminals is equally applicable to such a design, and so is the proposed solution of the present invention. Thus, the above described embodiments should be regarded as illustrative rather than restrictive, and it should be appreciated that variations may be made in those embodiments by those skilled in the arts without departing from the scope of the present invention as defined in the appended claims.

The invention claimed is:

1. A communication terminal comprising:
   a housing;
   a user interface on a front side of the housing, said housing carrying therein a radio antenna element, a PCB comprising a ground plane extending longitudinally through the terminal behind said user interface;
   a speaker; and
   a chamber that acts as an electromagnetic resonance cavity for the antenna and as an acoustic resonance cavity for the speaker;
   wherein said speaker is mounted inside said chamber, wherein said speaker is placed behind said PCB and completely behind said user interface as viewed from said front side, wherein sound is coupled from the speaker to a front outlet by means of an opening formed in said PCB at the speaker, a sound channel extending from said opening longitudinally in the terminal between said PCB and said user interface, past said speaker, to a bent portion leading the sound channel around an edge of said user interface at an end portion of the terminal, and wherein the sound channel extends from the bent portion to the channel front outlet substantially perpendicular to said front side.

2. The communication terminal as recited in claim 1, wherein said sound channel further comprises a channel top outlet extending in a substantially longitudinal direction of the terminal at a top side of said housing.

3. The communication terminal as recited in claim 1, wherein said user interface is a display.

4. The communication terminal as recited in claim 1, wherein said user interface is a key pad.

5. The communication terminal as recited in claim 1, wherein said ground plane defines a wall part of the chamber, through which wall part said sound channel front outlet extends.

6. The communication terminal as recited in claim 1, wherein said chamber is sealed.

7. The communication terminal as recited in claim 1, wherein said chamber has a substantially rectangular box shape.

8. The communication terminal as recited in claim 1, wherein said antenna element comprises a substantially flat pattern of conductive material on a wall of said chamber.

9. The communication terminal as recited in claim 1, wherein said speaker is configured to convey audio information to a terminal user.

10. The communication terminal as recited in claim 1, wherein said speaker is configured to act as a ringer by transmitting a predetermined sound signal to bring a user's attention to the terminal.

11. The communication terminal as recited in claim 1, wherein said speaker comprises a buzzer configured to act as a ringer by transmitting a predetermined sound signal to bring a user's attention to the terminal.

12. The communication terminal as recited in claim 1, wherein said speaker is a multi mode actuator configured to act as a ringer and as a vibrator by transmitting predetermined sound signals or vibrations to bring a user's attention to the terminal.

* * * * *

UNITED STATES PATENT AND TRADEMARK OFFICE
CERTIFICATE OF CORRECTION

PATENT NO. : 7,233,678 B2
APPLICATION NO. : 10/519822
DATED : June 19, 2007
INVENTOR(S) : Erixon et al.

It is certified that error appears in the above-identified patent and that said Letters Patent is hereby corrected as shown below:

On Title Page:

Sec. (75): Please correct "Goran Schack, Yngsjo (SE)"
To read --Goran Schack, Ahus (SE)--

Column 1, Line 11: Please correct "filed Jul. 8, 2000"
To read -- filed Jul. 8, 2002--

Signed and Sealed this

Ninth Day of October, 2007

JON W. DUDAS
*Director of the United States Patent and Trademark Office*